United States Patent [19]
Backof, Jr. et al.

[11] Patent Number: 4,646,326
[45] Date of Patent: Feb. 24, 1987

[54] QAM MODULATOR CIRCUIT

[75] Inventors: Charles A. Backof, Jr., Hoffman Estates, Ill.; Mark E. Huntzinger, Sharon, Mass.

[73] Assignee: Motorola Inc., Schaumburg, Ill.

[21] Appl. No.: 543,740

[22] Filed: Oct. 20, 1983

[51] Int. Cl.[4] .......................................... H04L 27/00
[52] U.S. Cl. .................................................. 375/39
[58] Field of Search ....................... 370/20; 375/39, 59

[56] References Cited

U.S. PATENT DOCUMENTS

| | | | |
|---|---|---|---|
| 3,569,834 | 3/1971 | Debart et al. | 325/38 |
| 3,887,768 | 6/1975 | Forney et al. | 375/39 |
| 3,925,611 | 12/1975 | Dennis | 375/39 |
| 3,955,141 | 5/1976 | Lyon et al. | 375/39 |
| 3,980,953 | 9/1976 | Nance et al. | 325/38 |
| 4,343,041 | 8/1982 | Forney, Jr. | 375/14 |
| 4,344,176 | 8/1982 | Qureshi | 375/15 |
| 4,358,853 | 11/1982 | Qureshi | 375/39 |
| 4,382,285 | 5/1983 | Sumner et al. | 364/724 |

OTHER PUBLICATIONS

"A MOS/LSI Multiple-Configuration 9600 BPS Data Modem", H. L. Logan, Jr. and G. D. Forney, Jr., IEEE Conference Record, 1976 Int'l Conf. on Communications, vol. III, Jun. 1976.

"A New Hardware Realization of Digital Filters", A. Peled, IEEE Trans. on Acoustics, Speech & Signal Proc., Dec. 1974.

"A 4800 Bit/s Microprocessor Data Modem", K. Watanabe, K. Inoue & Y. Sato, IEEE Trans. on Comm'ns, vol. COM-26, No. 5, May 1978.

Primary Examiner—Douglas W. Olms
Attorney, Agent, or Firm—James E. Jacobson; Donald B. Southard; Edward M. Roney

[57] ABSTRACT

A method and means for quadrature amplitude modulation is described. The improved QAM modulator circuit utilizes a small read only memory to hold multiple versions of a signal constellation resulting in the elimination of hardware modulator circuits. In addition, the described device can be potentially any modulation scheme on an input signal which is sampled in time by modifying the contents of said ROM.

9 Claims, 9 Drawing Figures

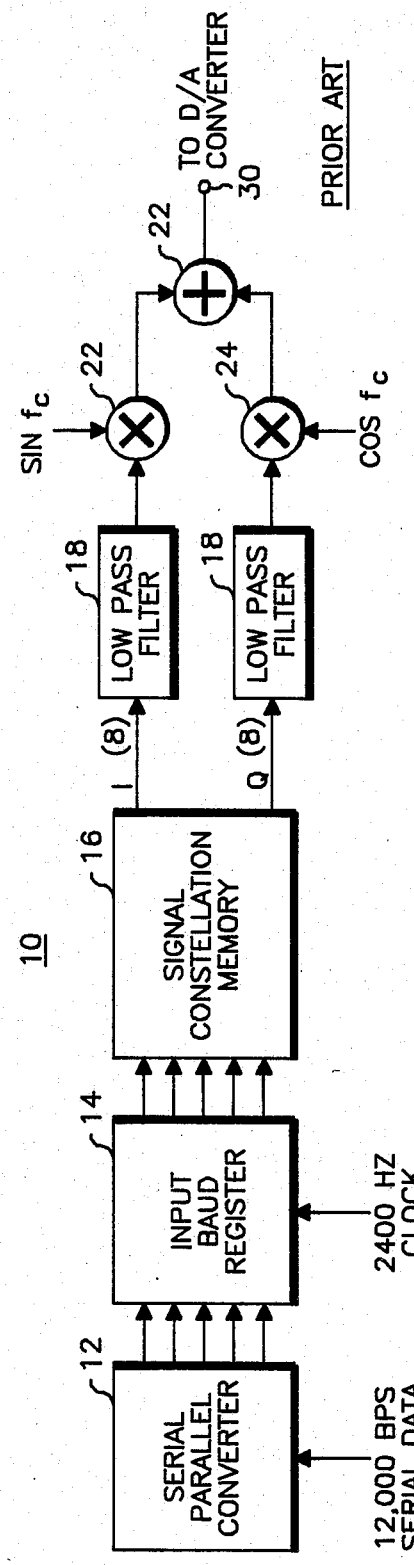
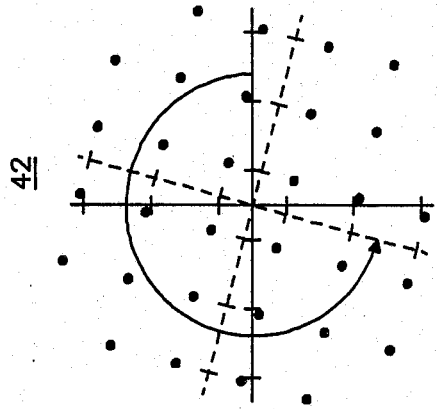
Fig. 1 PRIOR ART
Fig. 2a 32 POINT SIGNAL CONSTELLATION
Fig. 2b

QAM MODULATOR CIRCUIT

BACKGROUND OF THE INVENTION

Quadrature amplitude modulation (QAM) systems are often utilized where high-speed data communications are required. Typical quadrature amplitude modulation devices are found in satellite communication systems, as well as terrestrial systems, which utilize modems for data communications. In addition, quadrature amplitude modulation circuits can be used in two-way mobile or portable communication systems where digital transmission and encoding techniques are utilized to ensure security of transmissions as required by public service and governmental organizations. Quadrature amplitude modulation systems are desirable because they allow for extremely efficient coding of digital data by encoding digital words comprising multiple data bits onto a modulated signal containing both phase and amplitude information. The data rates of quadrature amplitude modulated signals are limited primarily by the complexity of circuits required both to generate and decode the QAM signals as well as noise and bandwidth characteristics of the transmission media. The field of data communications has grown dramatically in recent years, and, therefore, development of techniques for increasing data transfer rate between devices over existing channels is increasingly important.

DESCRIPTION OF THE PRIOR ART

According to conventional quadrature amplitude modulation teachings, a quadrature amplitude signal can be generated by manipulating an input baud in the following manner. An incoming input baud is used to select a specific point in a signal constellation. The values of the signal constellation are stored in any type of conventional ROM which is programmed according to computations corresponding to coordinates of specific points in the predetermined signal constellation.

Each input baud is represented by a specific representation referring to a location in a constellation matrix. For "N" bit bauds, $2^N$ points are specified. The values of the coordinates of a particular point in the constellation are processed by in-phase and quadrature low pass filters. The outputs of the filters are mixed in quadrature to obtain a carrier signal, thus providing a quadrature amplitude modulation signal. The required circuitry for this technique is quite complex especially if digital filters and digital modulators are used. Since large memories are required to implement these circuits, the resultant devices are quite expensive.

SUMMARY OF THE INVENTION

It is therefore an object of the present invention to provide a quadrature amplitude modulation circuit which can implement a QAM function without the use of a hardware modulator circuit.

It is yet another object of the present invention to provide a QAM modulator which is implemented with efficient usage of memory.

It is still another object of the present invention to provide a modulator circuit which can generate any modulation or an input signal by simply manipulating coefficients stored in ROM.

Briefly described, the present invention contemplates a quadrature amplitude modulation circuit which eliminates the need for discrete hardware modulators. According to the present invention, hardware modulators are replaced by sampled time filters which are configured to provide an impulse response which is determined by multiplying an impulse response from the desired low pass filter response with the instantaneous value of a predetermined carrier signal. The sampled time filter are disposed with substantially identical bandwidths and quadrature relationships. Phase shifted versions of the predetermined signal constellation are stored in a signal constellation memory to compensate for a phase advance of the carrier signal will respect to each input baud. The phase-shifted versions of the signal constellation are related to each other according to the ratio of the frequency of the carrier signal with respect to the frequency of the input baud. The number of phase shifted signal constellations which are required also depends on the exact ratio of the carrier signal frequency and the input baud frequency. The output signals of the sample time filters are then combined to provide a modulator output signal.

DESCRIPTION OF THE DRAWINGS

FIG. 1 is a block diagram of a conventional prior art QAM modulator circuit.

FIG. 2A shows a typical signal constellation which could be utilized in accordance with the present invention.

FIG. 2B shows a signal constellation which has been phase shifted by a predetermined amount in accordance with the present invention.

DETAILED DESCRIPTION OF THE DRAWINGS

Figure 3:
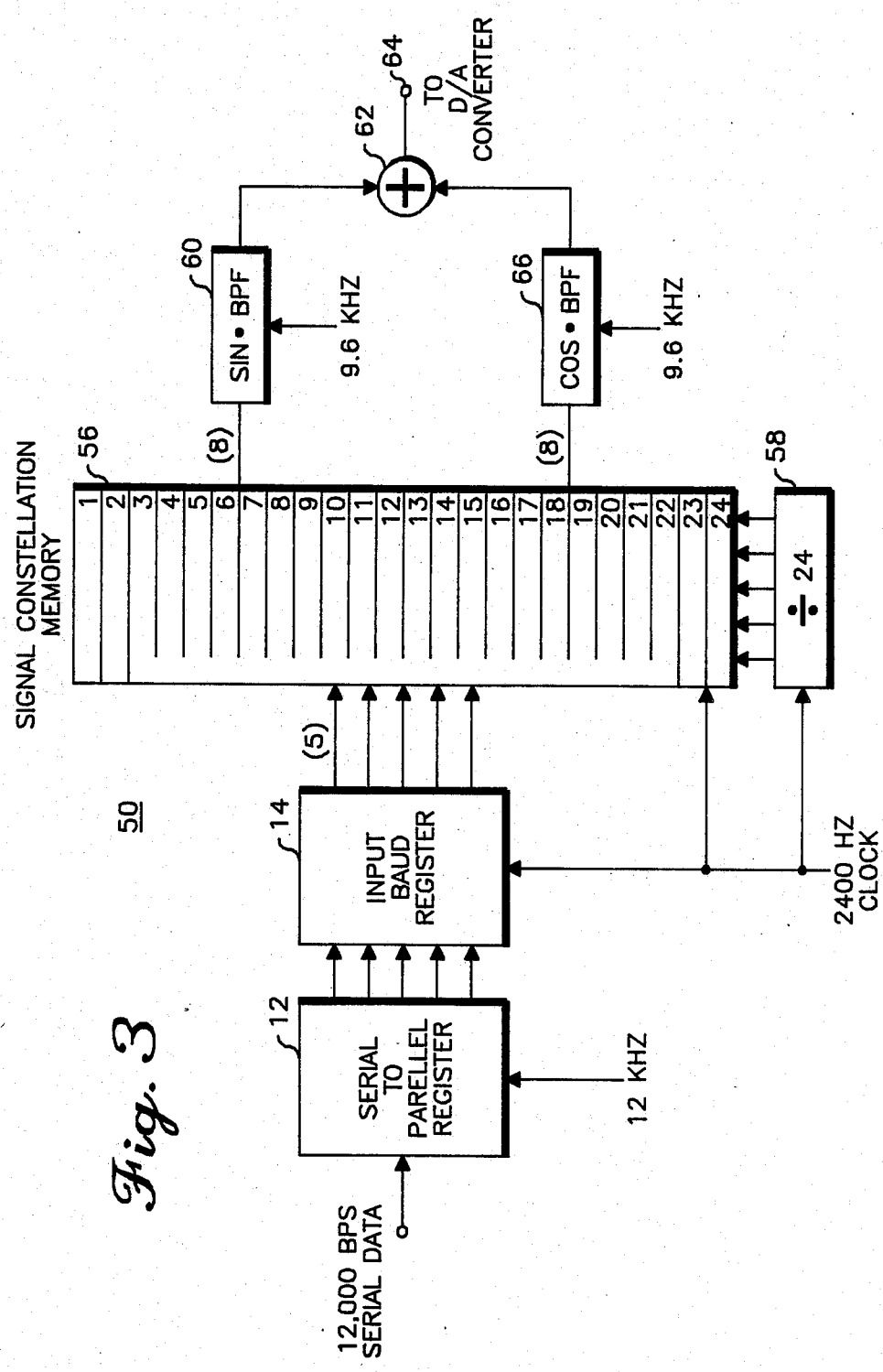
FIG. 3 is a schematic and block diagram of the preferred embodiment of the present invention.

FIG. 1 is a block diagram of a conventional prior art QAM modulator circuit. According to FIG. 1, a data signal to be modulated is first inputted to a serial to parallel converting device 12. The serial to parallel converter 12 is then coupled to an input baud register 14. When a plurality of data bits have been accumulated in the serial to parallel converter, they are transferred to the input baud register 14. The output of the baud register 14 is coupled to a signal constellation read-only memory 16. The incoming data bits from the input baud register are coupled to the memory address lines of the signal constellation memory. Therefore, any combination of data bits will correspond to a unique address in a signal constellation memory. Each unique signal constellation memory address will produce an in-phase and quadrature phase output signal corresponding to points within the signal constellation. The signal constellation will be discussed more fully below. The in-phase and quadrature phase outputs of the signal constellation memory 16 are then coupled to low pass filters 18 and 20. Low pass filters 18 and 20 impart a desired frequency response characteristic to the quadrature amplitude modulation signal. Filters 18 are then coupled to hardware modulator circuits 22 and 24, which multiply the low pass filter output signal with signals which are equal in frequency but quadrature in phase to produce two channels of correlated and modulated data. The modulated data from multipliers 22 and 24 is coupled to a summing circuit 28 which combines the modulated data signals produced in output 30. The circuit shown in FIG. 1 is further described and shown in greater detail in an article entitled "A MOS LSI Multiple-Configuration 9600 BPS Data Modem" authored by Hugh L. Logan Jr. and G. David Forney, Jr. and published by *IEEE International Conference on Communications* (1976), IEEE catalog number 76CH 1085-0 CSCB and is herein incorporated by reference.

Referring now to FIG. 1, it will be apparent that unless the rate at which data travels through the various circuits is exactly equivalent to the carrier frequency of the modulation circuit, each advancing data group will be met by a different phase of the carrier signal.

Circuits which seek to eliminate hardware modulator circuits as such through sampled time filter techniques are disadvantaged in that the phase disparity of the carrier and the data group at the time the data group reaches the modulator must be accounted for.

Referring still to FIG. 1, the QAM modulator is configured to modulate incoming data at 12,000 bit/second. The data bits are accumulated in the serial to parallel converter 12 five at a time and are subsequently output at a rate of 2,400 words/second where a word is here defined as a group of 5 data bits. The data words which appear at the output of the input baud register 14 form the binary address to the signal constellation which cause corresponding coordinate values to appear at the outputs of the signal constellation memory 16. If a carrier frequency of 1700 Hz is required, a common telephone line specification, then the phase disparity of the carrier frequency can be described in the following manner. If $f_c$ is the modulator carrier frequency, and $f_s$ is the sampling rate of the data words, their relative frequencies result in a phase shift of:

$$\frac{f_c \text{ cycles/sec}}{f_s \text{ samples/sec}} \cdot \frac{(360°)}{\text{cycle}} = \frac{X°}{\text{sample}}$$

This number represents the carrier phase advance for each subsequent data word. In the preferred embodiment, the phase advance is calculated as $$\frac{1700 \text{ Hz}}{2400 \text{ Hz}} \times 360° = 255°/\text{baud}$$

As can be calculated from the above relationship, for the values indicated, the phase advance relationships will repeat exactly for every group 24 data words which travel through the modulator. In other words, with a carrier frequency of 1700 Hz and a data word rate of 2400 Hz, there are 24 possible phase relationships. These determinations are of no consequence for the circuit of FIG. 1 which compensates for this effect automatically. However, if the free-running modulator is replaced by a digital filter, the phase relationship must be accounted for by either constant updating of the sampled time filter coefficients or by compensating by some external means. If the phase disparity is compensated for at the sampled time filter, utilizing the data rates and carrier frequency of the preferred embodiment, 24 separate in-phase and quadrature phase sampled time filters are required or a total of 48 filters. Since the memory requirement of sampled time filters is greater than that of a constellation memory, compensating for a phase disparity using sampled time filters is prohibitively costly.

FIG. 2A shows a typical 32-point signal constellation which could be used in accordance with the present invention. According to the practice of the present invention, 5 data bits can represent a total of 32 possible combinations. Furthermore, these 32 possible combinations can be represented as a matrix of points as shown in FIG. 2A. Thus, every possible binary combination of incoming data is represented by a point, as shown in FIG. 2A. Subsequently, each of the 32 points shown in FIG. 2A can also be represented as a combination of coordinates relating Cartesian (X,Y) location information. The Cartesian (X,Y) designations can then be converted to a combination of phase and amplitude information by the QAM modulator. It should be noted that the actual size of the signal constellation is not a limiting feature of the present invention. Several configurations of signal constellations will function satisfactorily and the specific size is limited primarily by the signal to noise ratio and bandwidth of the communications channel.

As disclosed above, each of the points in the constellation is assigned a specific data value. The assignment of data values of the signal constellation is somewhat arbitrary, however these values can be optimized to reduce the possibility of decoding errors due to values which are similar to adjacent locations in the signal constellation. For the purposes of the present invention, these constellation locations are assigned the data values as shown in Table 1 below:

TABLE 1

| INPUT BAUD VALUE | IN PHASE OUTPUT | QUADRATURE PHASE OUTPUT |
| --- | --- | --- |
| 1 | −48 | 80 |
| 2 | −16 | 80 |
| 3 | 16 | 80 |
| 4 | 48 | 80 |
| 5 | −80 | 48 |
| 6 | −48 | 48 |
| 7 | −16 | 48 |
| 8 | 16 | 48 |
| 9 | 48 | 48 |
| 10 | 80 | 48 |
| 11 | −80 | 16 |
| 12 | −48 | 16 |
| 13 | −16 | 16 |
| 14 | 16 | 16 |
| 15 | 48 | 16 |
| 16 | 80 | 16 |
| 17 | −80 | −16 |
| 18 | −48 | −16 |
| 19 | −16 | −16 |
| 20 | 16 | −16 |
| 21 | 48 | −16 |
| 22 | 80 | −16 |
| 23 | −80 | −48 |
| 24 | −48 | −48 |
| 25 | −16 | −48 |
| 26 | 16 | −48 |
| 27 | 48 | −48 |
| 28 | 80 | −48 |
| 29 | −48 | −80 |
| 30 | −16 | −80 |
| 31 | 16 | −80 |
| 32 | 48 | −80 |

Therefore, when an input baud value between 1 and 32 appears at the input of the input baud register 14 in FIG. 1, a corresponding value for X and Y appear on the signal constellation ROM output to be applied to the in-phase and quadrature phase filter 18 corresponds to the I and Q channels of the QAM modulator.

Referring now to FIGS. 2A and 2B, there is shown the relationship between a standard signal constellation and a constellation which has been advanced in phase in accordance with the present invention. Accordingly, FIG. 2b shows a constellation which has been advanced 255°. This constellation represents values which would be stored in the second memory location of the constellation memory 56 of FIG. 3. The values of a typical constellation and the rotated constellation of FIGS. 2a and 2b are shown below in Table 2 for comparison.

TABLE 2

| Input Baud Value | Original Coordinates | | Phase Rotated Coordinates | |
|---|---|---|---|---|
| | X | Y | X | Y |
| 1 | −48 | 80 | 90 | 26 |
| 2 | −16 | 80 | 81 | −5 |
| 3 | −16 | 80 | 73 | −36 |
| 4 | 48 | 80 | 65 | −67 |
| 5 | −80 | 48 | 67 | 65 |
| 6 | −48 | 48 | 59 | 34 |
| 7 | −16 | 48 | 51 | 3 |
| 8 | 16 | 48 | 42 | −28 |
| 9 | 48 | 48 | 34 | −59 |
| 10 | 80 | 48 | 26 | −90 |
| 11 | −80 | 16 | 36 | 73 |
| 12 | −48 | 16 | 28 | 42 |
| 13 | −16 | 16 | 20 | 11 |
| 14 | 16 | 16 | 11 | −20 |
| 15 | 48 | 16 | 3 | −51 |
| 16 | 80 | 16 | −5 | −81 |
| 17 | −80 | −16 | 5 | 81 |
| 18 | −48 | −16 | −3 | 51 |
| 19 | −16 | −16 | −11 | 20 |
| 20 | 16 | −16 | −20 | −11 |
| 21 | 48 | −16 | −28 | −42 |
| 22 | 80 | −16 | −36 | −73 |
| 23 | −80 | −48 | −26 | 90 |
| 24 | −48 | −48 | −34 | 59 |
| 25 | −16 | −48 | −42 | 28 |
| 26 | 16 | −48 | −51 | −3 |
| 27 | 48 | −48 | −59 | −34 |
| 28 | 80 | −48 | −67 | −65 |
| 29 | −48 | −80 | −65 | 67 |
| 30 | −16 | −80 | −73 | 36 |
| 31 | 16 | −80 | −81 | 5 |
| 32 | 48 | −80 | −90 | −26 |

Referring now to FIG. 3 there is shown an electrical schematic and block diagram of the preferred embodiment of the present invention. The QAM modulator circuit of FIG. 3 includes a serial to parallel converter register 52 which is coupled to an input baud register 54, as in FIG. 1 incoming serial data is inputted to the serial to parallel converter 12 which accumulates the serial data bits in group of five bits and then transfers the five data bits to the baud register 54. The serial-to-parallel converter 12 and input baud register 54 are well known devices and several widely available components would function satisfactorily in the practice of the present invention.

The output of the input baud register 54 is coupled to signal constellation memory 56 which contains multiple versions of the signal constellation which are derived in accordance with the method previously discussed in FIG. 2, however for the data and carrier frequency values chosen in accordance with the preferred embodiment of the present invention, the phase advance sequence repeats every 24 cycles; therefore, 24 separate versions of a signal constellation are required to compensate for phase advance determined in accordance with the present invention. The output of the signal constellation memory 56 is coupled to digital filters 60, 66 which are configured to provide a SINE or COSINE multiplication function, as well as a filter function which is discussed in more detail below. The filters 60, 66 are then coupled to a summing network 62 which provides the QAM output signal at terminal 64. The signal constellation memory can be fabricated from many well known memory circuits such as MC 2708 which can be configured to provide multiple outputs as well as having an address input which is easily adaptable to the practice of the present invention.

The signal constellation memory 54 also cooperates with a binary counter 58. The input baud register 14, the binary counter 58 and the signal constellation memory 56 are coupled to a common clock signal. The binary counter 58 can be any suitable counter which can interface with a memory address input. The binary counter 58 operates to select individual constellation copies stored in the signal constellation memory by sequentially incrementing a portion of the signal constellation memory 56 address input. Device which are suitable for use as a serial-to-parallel converter 12, an input baud register 14, a binary counter 58, and a signal constellation memory 56 are available from Motorola Communications and Electronics, 1313 E. Algonquin Rd., Schaumburg Il, 60196.

Referring now to FIG. 4, there is shown a series of graphs demonstrating the desired characteristics of the filters 60 and 66 of the present invention. FIG. 4a shows a typical impulse response to a low pass filter such as the type shown in FIG. 1. A typical 32 tap low pass filter will exhibit the impulse response shown in FIG. 4a characterized by the envelope waveform shown in FIG. 4b. FIG. 4c represents a desired carrier signal waveform which would be used to modulate a data signal. The waveform of FIG. 4c corresponds to the modulator (22) $f_c$ input shown in FIG. 1.

Therefore, in order to duplicate the function of the modulator circuit of FIG. 1, the present invention contemplates combining the impulse response of a typical low pass filter with the instantaneous value of a carrier signal at a desired frequency.

Figure 4A:
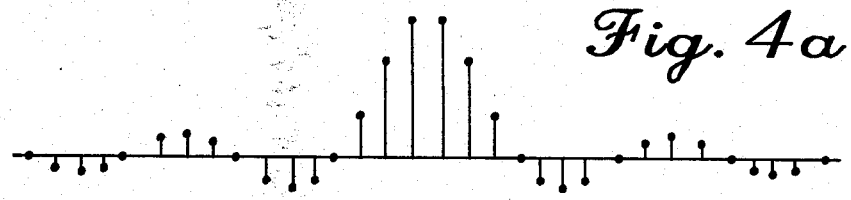
FIGS. 4A through 4E are graphs which illustrate the desired characteristics of the digital filters shown in FIG. 3.
Figure 4B:
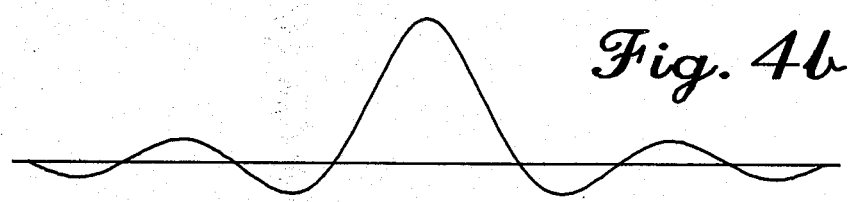
Figure 4C:
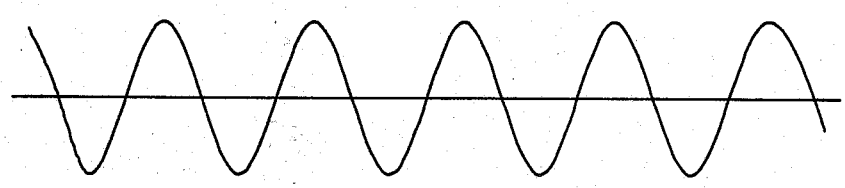
Figure 4D:
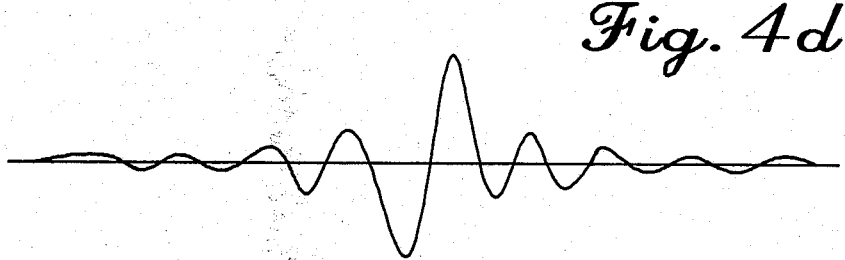

FIG. 4d demonstrates the practice of the present invention by showing the resultant envelope of the impulse response required for the sampled time filter 60 of FIG. 3. The waveform shown in FIG. 4d is obtained by combining or muliplying the waveform of FIG. 4b with the waveform of FIG. 4c.

Figure 4E:
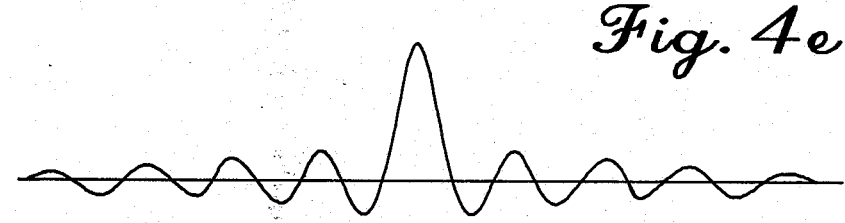

In a similar fashion the FIG. 4e shows the desired resultant impulse response of the sampled time filter 66 of FIG. 3. The waveform of FIG. 4e is obtained by combining the impulse response of FIG. 4b with the waveform of FIG. 4c which has been shifted by 90°. Therefore the waveforms of FIGS. 4d and 4e exhibit a quadrature relationship with respect to each other.

It should be noted that sampled time filters are well known in the art and several configurations would perform satisfactorily with the present invention. In addition, techniques for determining a desired impulse response to a digital filter are also well known. These techniques vary depending on the exact configuration of the filter; however, a filter suitable for use in the practice of the present invention is described in an article entitled "A Hardware Realization of Digital Filters" authored by Abraham Peled and Bede Liu published in December 1974 in the *IEEE Transactions on Acoustics, Speech and Signal Processing* and is herein incorporated by reference. In the preferred embodiment of the present invention, a finite impulse response digital filter configuration was chosen to simplify the impulse response calculation. A suitable finite impulse response filter and method for deriving coefficients for the filter is described in detail in the Peled and Liu article previously described above and incorporated by reference.

In the preferred embodiment of the present invention, a 32 tap finite impulse response filter was chosen. This configuration was chosen because intersymbol interference is reduced by allowing the filter to operate at a frequency which is four times higher than the baud frequency. Therefore a baud is input to the filter followed by 3 cycles of a zero value.

It is worthy of note that the practice of the present invention is not limited to digital filters per se. In fact the invention contemplates any filter which can be configured to provide a predetermined impulse response. For instance, the invention could be implemented with a Surface Acoustic Wave filter which is well known.

In addition, by manipulating the impulse response of the filter and the configuration of the constellation memory, virtually any modulation scheme can be generated. For instance, by utilizing a low pass filter in the in-phase channel and a Hilbert Transformed low pass filter in the quadrature phase channel, the same structure can be used to generate signal sideband modulation. As with conventional hardware modulator or mixer structures, the implementation of the present invention can also be used to demodulate signals as well. Accordingly, other uses and modifications will be obvious to one skilled in the art, without departing from the spirit and scope of the present invention.

What is claimed is:

1. A circuit for modulating data in accordance with a predetermined modulation scheme, said circuit comprising:
   (a) means for inputting data at a predetermined rate;
   (b) means for storing and retaining said inputted data for a predetermined period;
   (c) memory means having first and second outputs and being coupled to said storage means, for storing multiple versions of a signal constellation, said signal constellations containing precomputed representations of every possible value of said inputted data wherein each of said multiple versions is related to each other according to a predetermined phase relationship;
   (d) first and second processing means coupled to said first and second outputs of said memory means, respectively, for processing said precomputed data to produce output signals, said processing means being configured to provide a predetermined impulse response in quadrature with respect to each other, chosen in accordance with a predetermined modulation scheme; and
   (e) means coupled to said first and second processing means for combining the output signals therefrom and providing an output signal.

2. The apparatus of claim 1 wherein said first and second processing means each comprise digital filters having a finite impulse response.

3. The apparatus of claim 1 wherein said first and second processing means each comprise surface acoustic wave filters.

4. The apparatus of claim 1 wherein said memory means further includes a binary counter coupled to an address input of said memory means for sequentially selecting particular versions of the signal constellation.

5. A circuit for modulating data in accordance with a predetermined modulation scheme, said circuit comprising:
   (a) A serial to parallel converter, said converter accepting serial data and providing a parallel output with a predetermined number of bits;
   (b) A data storage register coupled to said serial to parallel converter for retaining said parallel data for a predetermined period;
   (c) A signal constellation memory having first and second address inputs and first and second parallel data outputs, said first address input coupled to said data storage register, said memory containing multiple versions of a signal constellation, each of said multiple versions being related according to a predetermined phase relationship;
   (d) A binary counter coupled to said second address input of said signal constellation memory for sequencing said memory between each of said versions of said signal constellation;
   (e) A first digital filter coupled to said first parallel data output of said signal constellation memory, said first digital filter being disposed with a first predetermined impulse response;
   (f) A second digital filter coupled to said second parallel data output of said signal constellation memory, said second digital filter being disposed with a second predetermined impulse response; and
   (g) A summing network coupled to said first and second digital filter, said summing network combining the output signals of said first and second digital filters and providing an output signal.

6. A modulator circuit for modulating data in accordance with a predetermined modulation scheme, said circuit consisting essentially of:
   (a) means for inputting data at a predetermined rate;
   (b) means for storing and retaining said data for a predetermined period;
   (c) memory means having a first and second parallel output, coupled to said storing means for storing precomputed values of a signal constellation, wherein said precomputed values correspond to every possible value of said captured input data;
   (d) first and second sampled time processing means coupled to said first and second parallel outputs of said memory means, respectively, said first and second sampled time processing means being configured to provide a predetermined impulse response chosen in accordance with a predetermined impulse response chosen in accordance with a predetermined modulation scheme and said first and second sampled time processing means having output signals disposed with quadrature relationship with respect to each other; and
   (e) means coupled to said first and second sampled time processing means for combining the output signals of said first and second sampled time processing means and providing an output signal.

7. A circuit for modulating data in accordance with a predetermined modulation scheme, said circuit comprising:
   (a) a serial to parallel converter, said converter accepting serial data and providing a parallel output with a predetermined number of bits;
   (b) a data storage register coupled to said serial to parallel converter for retaining said parallel data for a predetermined period;
   (c) memory means having a first and second parallel output, coupled to said data storage means for storing precomputed values of a signal constellation, wherein said precomputed values correspond to every possible value of said captured input data;
   (d) a first sampled time filter coupled to said first parallel data output of said memory means, said first sampled time digital filter being disposed with a first predetermined impulse response;

(e) a second sampled time filter coupled to said second parallel data output of said memory means, said second sampled time digital filter being disposed with a second predetermined impulse response; and (f) a summing network coupled to said first and second sampled time filters, said summing network combining the output signal of said first and second sampled time filters and providing an output signal.

8. A method for modulating data in accordance with a predetermined modulation scheme, said method comprising the steps of:

(a) inputting data at a predetermined rate;

(b) retaining said inputted data for a predetermined period;

(c) storing multiple versions of a signal constellation, said signal constellations containing precomputed representations of every possible value of said retained inputted data and wherein each of said multiple versions is related to each other according to a predetermined phase relationship;

(d) sequentially selecting a version of said signal constellation;

(e) addressing a location in the selected version of a signal constellation by utilizing the inputted data;

(f) outputting first and second data words representing orthogonal coordinates of a signal constellation point corresponding to said inputted data;

(g) processing said first and second data words according to a first and second predetermined impulse response, respectively; and (h) combining the process first and second data words to provide an output signal.

9. A method for modulating data in accordance with a predetermined modulation scheme, said method comprising the steps of:

(a) inputting data at a predetermined rate;

(b) storing and retaining said inputted data for a predetermined period;

(c) storing multiple versions of a signal constellation, said signal constellations containing precomputed representations of every possible value of said inputted data wherein each of multiple versions is related to each other according to a predetermined phase relationship;

(d) processing said stored signal constellations with first and second processing means to provide first and second output signals, each of said processing means being configured to provide a predetermined impulse response in quadrature with respect to each other, chosen in accordance with a predetermined modulation scheme; and (e) combining said first and second output signals and providing a third output signal comprising modulated data.

* * * * *